United States Patent [19]
Ueda et al.

[11] Patent Number: 5,150,339
[45] Date of Patent: Sep. 22, 1992

[54] OPTICAL DISK MEDIUM AND ITS APPLICATION METHOD AND SYSTEM

[75] Inventors: Hirotada Ueda, Kokubunji; Seiji Yonezawa, Hachioji; Takashi Takeuchi, Fujisawa, all of Japan

[73] Assignee: Hitachi, Ltd., Tokyo, Japan

[21] Appl. No.: 512,116

[22] Filed: Apr. 20, 1990

Related U.S. Application Data

[63] Continuation-in-part of Ser. No. 462,565, Jan. 9, 1990.

[30] Foreign Application Priority Data

Apr. 24, 1989 [JP] Japan .................. 1-101624
Jun. 16, 1989 [JP] Japan .................. 1-152341

[51] Int. Cl.⁵ .................. G11B 17/22; G11B 3/70; G11B 5/84; G11B 7/26
[52] U.S. Cl. .................. 369/32; 369/14; 369/275.2; 369/275.4; 369/111
[58] Field of Search .............. 358/342; 369/14, 275.2, 369/275.1, 275.4, 111, 32, 44.26, 13, 44.28; 360/131, 114, 59

[56] References Cited

U.S. PATENT DOCUMENTS

| | | | |
|---|---|---|---|
| 4,703,408 | 11/1987 | Yonezawa et al. | 369/44.26 |
| 4,788,672 | 11/1988 | Toyooka et al. | 369/32 |
| 4,789,979 | 12/1988 | Hiraoka et al. | 369/32 |
| 4,872,151 | 10/1989 | Smith | 369/14 |
| 4,872,154 | 10/1989 | Sakagami et al. | 369/275.1 |
| 4,879,704 | 11/1989 | Takagi et al. | 369/14 |
| 4,949,331 | 8/1990 | Maeda et al. | 369/275.3 |
| 5,012,461 | 4/1991 | Yoshida et al. | 369/32 |
| 5,018,120 | 5/1991 | Tsuji et al. | 369/32 |

FOREIGN PATENT DOCUMENTS

56-22065  5/1981  Japan .
61-280046 12/1986 Japan .

*Primary Examiner*—Dale M. Shaw
*Assistant Examiner*—Thai Tran
*Attorney, Agent, or Firm*—Antonelli, Terry, Stout & Kraus

[57] ABSTRACT

In the present invention, there is provided an optical disk medium wherein a ROM region having data already recorded therein and capable of only optically reproducing (reading) the data as well as a RAM region capable of optically recording and reading out therein and therefrom are interlacedly located in such a positional relationship that enables the substantially continuous and high-speed accessing operation to the read-only ROM and rewritable RAM data, and some of stationary data to be stored suitably in the ROM region are stored in positional relationship closer to some of additional data to be stored suitably in the RAM region which are especially closely related to the some of the stationary data.

19 Claims, 5 Drawing Sheets

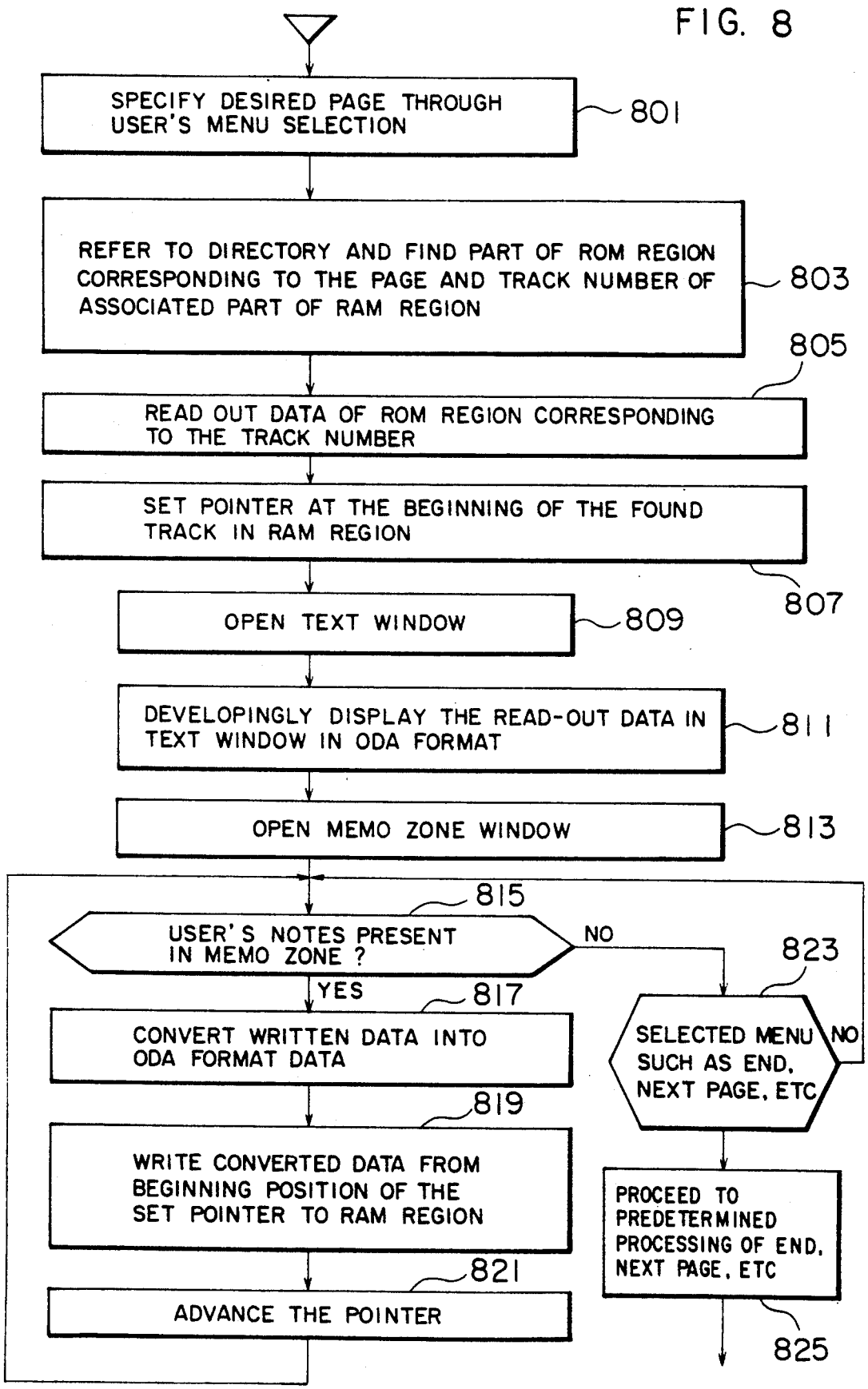

OPTICAL DISK MEDIUM AND ITS APPLICATION METHOD AND SYSTEM

CROSS-REFERENCE TO RELATED APPLICATION

This application is a continuation-in-part of our co-pending application Ser. No. 462,565 filed on Jan. 9, 1990, the disclosure of which is hereby incorporated by reference.

BACKGROUND OF THE INVENTION

The present invention relates to an optical disk medium into and from which data are optically recorded and read out with use of an optical head, and also to a method and system for utilizing the optical disk medium.

In a conventional optical disk medium on which document data are to be digitally recorded, there has been employed such a method that ROM and RAM region bands are provided in inner and outer peripheral parts of the disk respectively, as disclosed, for example, in Japanese Patent Appln. Laid-Open Publication No. 61-280048. According to this method, in this way, the inner peripheral ROM region is located as separated from the outer peripheral RAM region. Thus, when it is desired to alternately and continuously read and write data in the ROM and RAM regions, this method requires an optical head to be moved or sought from the inner peripheral location to the outer peripheral location of the disk and thus requires a large head movement (seek) time.

SUMMARY OF THE INVENTION

Conventionally, the aforementioned head movement time has not been taken into special consideration, because attention has been directed only to such applications that data not related closely to each other are stored respectively in the ROM and RAM regions of the disk. However, when much consideration is given to such a new application as electronic publication, this often requires that data stored in the ROM region be closely related to those stored in the RAM region. For this reason, in the event where such a disk is used in such a new application as to be detailed later in connection with an embodiment, the user must wait until the movement of the optical head is completed, i.e., during the aforementioned head movement time, which results in that the system becomes bad in handleability.

It is an object of the present invention to provide an optical disk medium which allows substantially continuous and high-speed access to read-only data (ROM data) and rewritable data (RAM data) stored therein, thus realizing the new application of the optical disk medium.

It is another object of the present invention to provide a data processing method and system in which an optical disk medium allowing substantially continuous and high-speed access to read-only data (ROM data) and rewritable data (RAM data) stored therein is used to immediately read out the ROM and RAM data substantially at the same time, thus improving the handleability of the system.

The present invention is featured in that a first region (ROM region) having first data already recorded therein and capable of only optically reproducing (reading) the first data as well as a second region (RAM region) capable of optically recording and reading out therein and therefrom are interlacedly located in such a positional relationship that enables the substantially continuous and high-speed accessing operation, and in that additional data to be stored suitably in the RAM region which are especially closely related to the some of stationary data stored in the ROM region are stored in positional relationship closer to some of the stationary data.

One of features of the present invention is that a first region (ROM region) and a second region (RAM region) are alternately provided as angularly divided. That is, the optically readable ROM region and the optically recordable/readable/erasable RAM region are positioned on an optical disk alternately along its track so that the read-only data (ROM data) and the rewritable data (RAM data) can be alternately accessed continuously and at a high speed.

Another of the features of the present invention is that a first region (ROM region) and a second region (RAM region) are disposed adjacent to each other within such a positional range that high speed positioning can be realized only through the deflection of the light spot without requiring any need for moving an optical head. More specifically, the first and second regions are alternately positioned in a mutually concentrical relationship. However, positioning within the range between the adjacent first and second regions (ROM and RAM regions) including both regions can be established at a high speed only through the deflection of the light spot without requiring any need for moving the optical head, and the read-only data (ROM data) and the rewritable data (RAM data) can be accessed substantially continuously at a high speed.

A further feature of the present invention is an optical disk medium in which a first region (ROM region) and a second region (RAM region) are interlacedly located in such a positional relationship that enables the substantially continuous and high-speed accessing operation, read-only data (ROM data) and rewritable data (RAM data) are accessible substantially continuously and at a high speed, and some of additional data to be stored suitably in the second region (RAM region) which are especially closely related to the some of stationary data stored in the first region (ROM region) are stored in positional relationship closer to some of the stationary data.

BRIEF DESCRIPTION OF THE DRAWINGS

FIG. 8 is a flowchart for explaining the operation of the system; and

DESCRIPTION OF THE PREFERRED EMBODIMENTS

Figure 1:
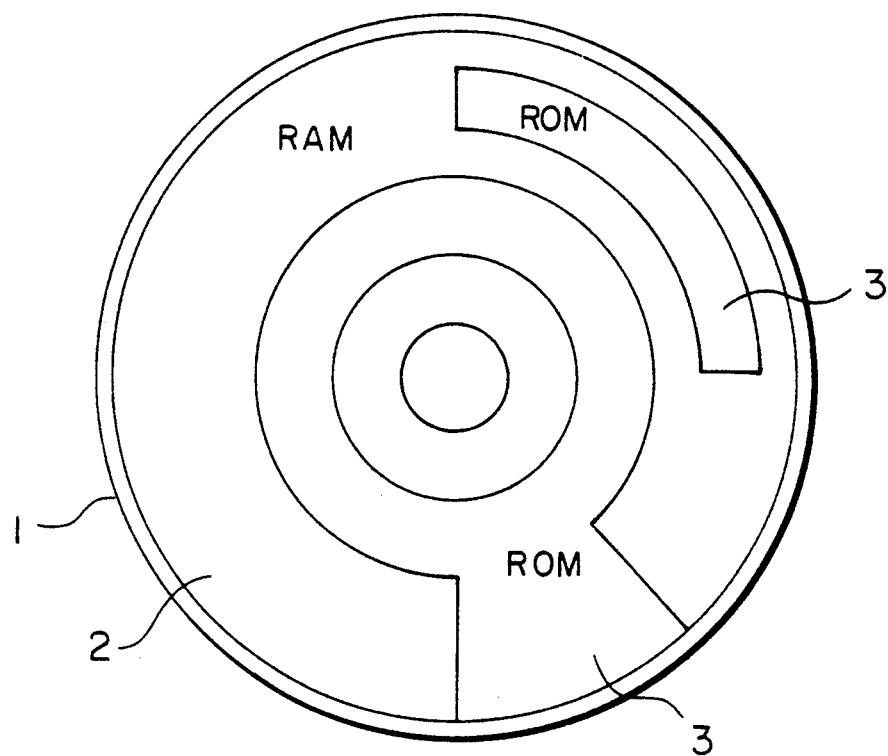
FIG. 1 shows an embodiment of an optical disk medium in accordance with the present invention.

In accordance with the present invention, there is provided an optical disk medium in which a first region (RAM region) having first data already recorded therein and capable of only optically reproducing (reading) the first data as well as a second region (ROM region) capable of optically recording and reading out therein and therefrom are interlacedly located in such a positional relationship that enables the substantially continuous and high-speed accessing operation, and some of additional data to be stored suitably in the second region (RAM region) which are especially closely related to the some of the stationary data stored in the first region (ROM region) are stored in positional relationship closer to some of the stationary data. It will be readily seen that the use of such an optical disk medium of the present invention is obviously effective, for example, when the optical disk medium is sold as an electronic book having data previously recorded in a ROM region thereon. A typical example of the stationary data to be suitably stored in the ROM region as mentioned herein is such data that have been so far sold in the form of a printed paper book. With the optical disk medium of the present invention, even when document data on a book are digitally recorded on the disk, data corresponding to one page of the book including sentences, table or tables, figure or figures, photograph or photographs and so on can be recorded within a limited narrow portion of the ROM region corresponding to merely several tracks (possibly below one track, several years later). And an optical head for access of the optical disk medium can be positioned (accessed) at a high speed only through deflection of the light spot without requiring any need for moving (seeking) the optical head so long as the head movement range corresponds to merely several tracks to several ten tracks. Thus, when the user reads such an electronic book (in particular, successive pages) in the form of an optical disk medium, he or she can display the desired pages substantially in no wait time.

Meanwhile, the RAM region, into and from which data can be optically recorded and read out, is utilized as a work area of a system for reading and editing the electronic book. The work area can be freely used and the user can write desired data into the work area. More importantly, the present invention is arranged, in particular, so that the user can freely process and edit the ROM data previously written by the disk supplier prior to its sale or marketing. And data resulting from the above processing or editing operation of the user refers to the aforementioned additional data to be stored suitably in the RAM region. For example, just as a reader can write notes in his printed paper book as necessary, so the user can write his notes in the optical disk (electronic book) through the display screen of the reproducing/editing system of the present invention or he can freely edit the contents of the electronic book and make a new version of book in accordance with his or her own style as a new usage of such electronic book. The user may change, e.g., the order of pages, chapters or sections of the electronic book or may read the book by skipping a desired chapter. In this case, since the original reading order of the ROM data is changed, a new additional data indicative of the changed reading order is written into the RAM region. Thereafter, when the user reads the processed/edited optical disk (electronic book), the reproducing/editing system automatically makes reference to the additional data written in the RAM region and changes the reading order, whereby the user can read the electronic book according to his or her own style. In addition such processing as wholly correcting words or phrases can be similarly realized. In this case, new additional data is indicative of a specification to replace the words or phrases by other ones. These new data created during the processing and editing operation are, as a matter of course, closely related to data indicative of a particular page (e.g., the page displayed on the screen) in the ROM region. The present invention is based on such an idea as mentioned above. That is, in accordance with the present invention, since the ROM and RAM regions are interlacedly located in such a positional relationship as allows substantially continuous and high-speed accessing operation, mutually related data created during processing and editing operation can be written into a part of the RAM region well adjacent to the part of the ROM region where the associated ROM data is already recorded. Therefore, when the user wants thereafter to read the book, the related data written in the RAM region is immediately read out substantially simultaneously with the reading of the ROM data so that modification of a displayed picture (modification of video data) based on the read-out data and display based on the modified video data can be realized at a high speed.

In the conventionally proposed techniques, on the other hand, the ROM and RAM regions are provided as spaced from each other by a relatively long distance as in the inner and outer peripheral portions of the disk so that accessing to both the ROM and RAM regions requires the movement (seek) of the optical head, which results in a large head seek time and a poor handleability of the system.

Explanation will next be as to how to access the read-only data (ROM data) and rewritable data (RAM data) substantially continuously and at a high speed.

In accordance with a feature of the present invention, the ROM and RAM regions are mutually alternatively located as angularly divided. In other words, the first optically readable region (ROM region) and the second optically recordable/readable/erasable region (RAM) are mutually alternately disposed on the optical disk along tracks, whereby the ROM and RAM data can be alternately accessed along tracks continuously and at a high speed. According to another feature of the present invention, the ROM and RAM regions are located to be alternately concentrically adjacent to each other within such a positional range that allows the high speed positioning of the optical head only through the deflection of light spot without requiring any need for moving the optical head. The optical disk system usually requires a large head seek time taken from one track to another. With respect to adjacent tracks within a certain range (from several to several ten tracks), however, the light spot can be moved at a high speed only through the deflection of the light spot by means of such an optical system as a mirror or such a solid-state deflecting element as an AO (Acoustic-Optical) deflecting element, without requiring any need for directly seeking the optical head. Accordingly, when tracks in the ROM region are set to be properly interlaced with tracks in the RAM region within the aforementioned range, the ROM and RAM data can be accessed at a high speed alternately and continuously.

Figure 2:
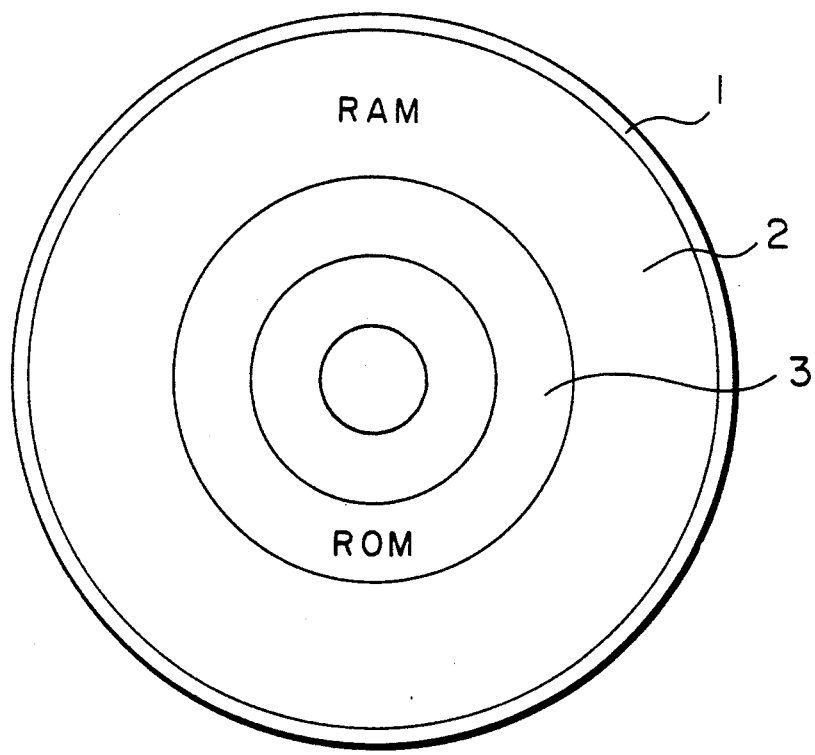
FIG. 2 shows a prior art optical disk medium.

Explanation will be made as to the structure of a prior art optical disk by referring to FIG. 2. In the drawing, an optical disk 1 has a RAM region 2 and a ROM region 3 located thereon as separated from each other respectively in its outer and inner peripheral portions. In the illustrated example, when it is desired to carry out continuous accessing operation to both the RAM and ROM regions 2 and 3, an optical head must be once moved to one of the regions and then to the initial position. In this way, since this involves such troublesome accessing operation, it is difficult to realize a high-speed processing of the both ROM and RAM data.

Referring to FIG. 1, there is shown an embodiment of an optical disk medium in accordance with the present invention, wherein only the ROM region 3 is provided in its inner peripheral annular portion of the disk within an annular range from its one radius to another while the RAM region 3 is provided as angularly divided and interlaced with another ROM region within the outer annular range. Provided in the RAM and ROM regions 2 and 3 are spiral or concentric tracks along which data is to be recorded, read out or erased. Accordingly, data stored in the ROM region 3 and data stored in the RAM region 2 can be continuously read out or written through tracking operation of the optical head. In other words, the ROM data and the RAM data can be alternately and continuously accessed at a high speed. And data related to the ROM data is written in a part of the RAM region very adjacent to that part of the ROM region where the related data is stored. Thus, when the user thereafter wants to read the optical disk book, the related data can be immediately read out substantially simultaneously with the reading operation of the ROM data. As a result, the user wait time can be substantially eliminated and the handleability of the system can be improved to a large extent. Further, the recording film used for the optical disk medium is preferably a magneto-optical recording film or a phase changed recording film. In this connection, since the ROM data are provided as pre-formatted (or pre-initialized) together with servo marks and so on in the form of phase pits (concave and convex pits) by the known replica technique, the disk can be manufactured on a mass production basis.

Figure 3:
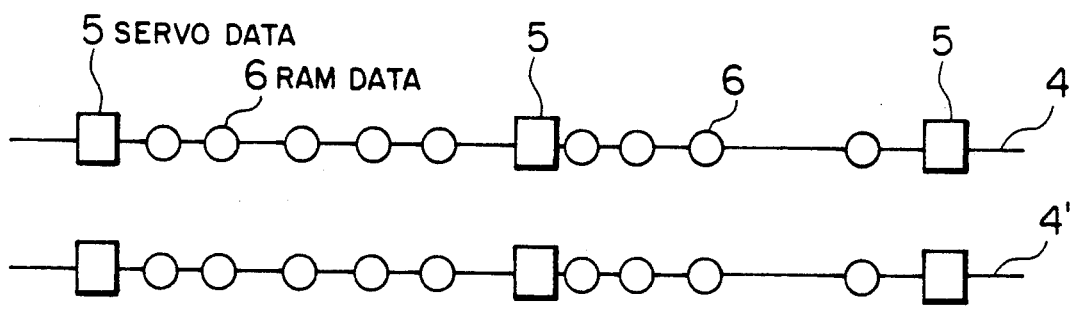
FIG. 3 shows an example of data recording tracks within a RAM region in the optical disk medium in accordance with the present invention.

FIG. 3 shows data recording tracks 4 and 4' within the RAM region 2 of the optical disk medium of FIG. 1. Each of the data recording tracks 4 and 4' has a multiplicity of servo marks 5 cyclically provided along the track and RAM data 6 recorded in user data recording zones between the servo marks 5. The servo marks 5 are pre-formatted by the replica technique in the form of phase pits (concave and convex pits) so that when the servo mark is optically reproduced or read out, the associated servo control signal can be detected. On the basis of the detected servo control signal, the position of an optical spot irradiated from the optical head is controlled on a servo basis so that the desired data 6 (for example, code data) can be recorded or read out into or from the user data recording zones between the servo marks 5 along the central lines of the tracks 4 and 4'. The servo mark 5 may comprise a pair of pits disposed on left and right sides of the central line of the track 4 or 4'.

Figure 4:
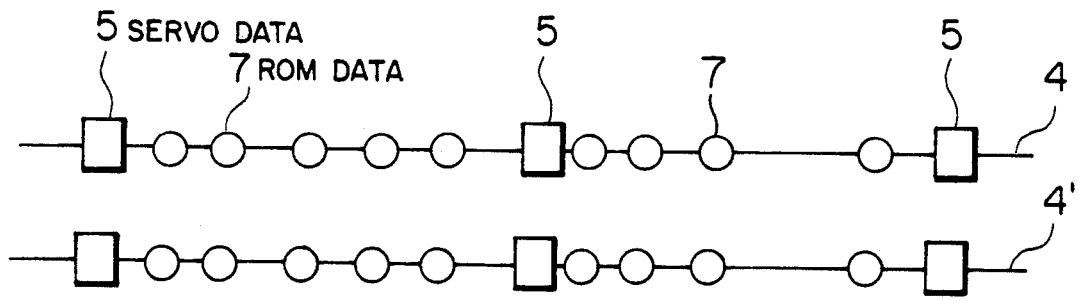
FIG. 4 shows an example of data read-only tracks within a ROM region in the optical disk medium in accordance with the present invention.

There is shown in FIG. 4 read-only tracks 4 and 4' which are provided in the ROM region 3 of the optical disk medium of FIG. 1. In the drawing, each of the read-only tracks 4 and 4' has a multiplicity of servo marks 5 cyclically provided along the track and read-only ROM data (for example, code data) 7 provided between these servo marks 5 along the track. The servo marks 5 and the ROM data 7 are previously provided by the replica technique both in the form of phase pits (concave and convex pits) so that the mark 5 and data 7, when subjected to the light spot directed from the optical head, are optically read to generate the associated servo control signal and reproduce the associated data respectively. In other words, these servo marks 5 are optically detected and sampled to obtain the servo control signal and the position of the light spot directed from the optical head is subjected to a servo control under control of the obtained servo control signal to reproduce the ROM data 7 between the servo marks 5 along the central line of the tracks 4 and 4'. The ROM data 7 can be only reproduced or read out from the disk and cannot be recorded thereon with use of the optical head.

Figure 5:
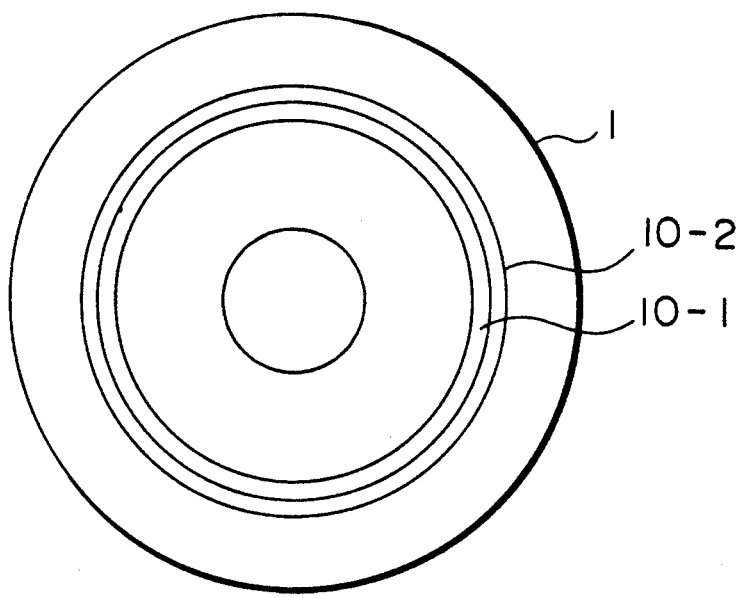
FIG. 5 shows another embodiment of the optical disk medium in accordance with the present invention.

Shown in FIG. 5 is another embodiment of the optical disk medium of the present invention, in which a ROM region 10-1 is located in an annular inner peripheral portion of the disk ranging from one radius to another while a RAM region 10-2 is located in an annular outer peripheral portion outside thereof, the regions 10-1 and 10-2 being interlacedly provided as divided in its radial direction. Though the ROM and RAM regions 10-1 and 10-2 are depicted respectively only one for easy illustration in FIG. 5, these regions are actually disposed concentrically and mutually alternately. And the width of the adjacent ROM and RAM regions are arranged so that the light spot can be positioned within such a width range at a high speed only through deflection of the light spot without requiring any need for moving the optical head. It goes without saying that such ROM and RAM regions 10-1 and 10-2 that have each a width corresponding to one track and that are alternately arranged repetitively also meet the aforementioned condition. And mutually closely related ones of stationary and additional data to be stored suitably in the ROM and RAM regions 10-1 and 10-2 respectively are stored in such parts of the ROM and RAM regions that are close to each other in position. As in the foregoing embodiment, each of the ROM and RAM regions 10-1 and 10-2 has concentric or spiral tracks along which data is recorded, read out or erased. With such an arrangement, since the light spot can be moved from one track of the ROM region to another track of the RAM region adjacent to the ROM region only through the deflection of the light spot caused by such an optical system as a mirror or by such a solid-state deflecting element as an AO deflecting element while eliminating the need for directly seeking the optical head, a high-speed processing of the related ROM and RAM data can be realized.

Figure 6:
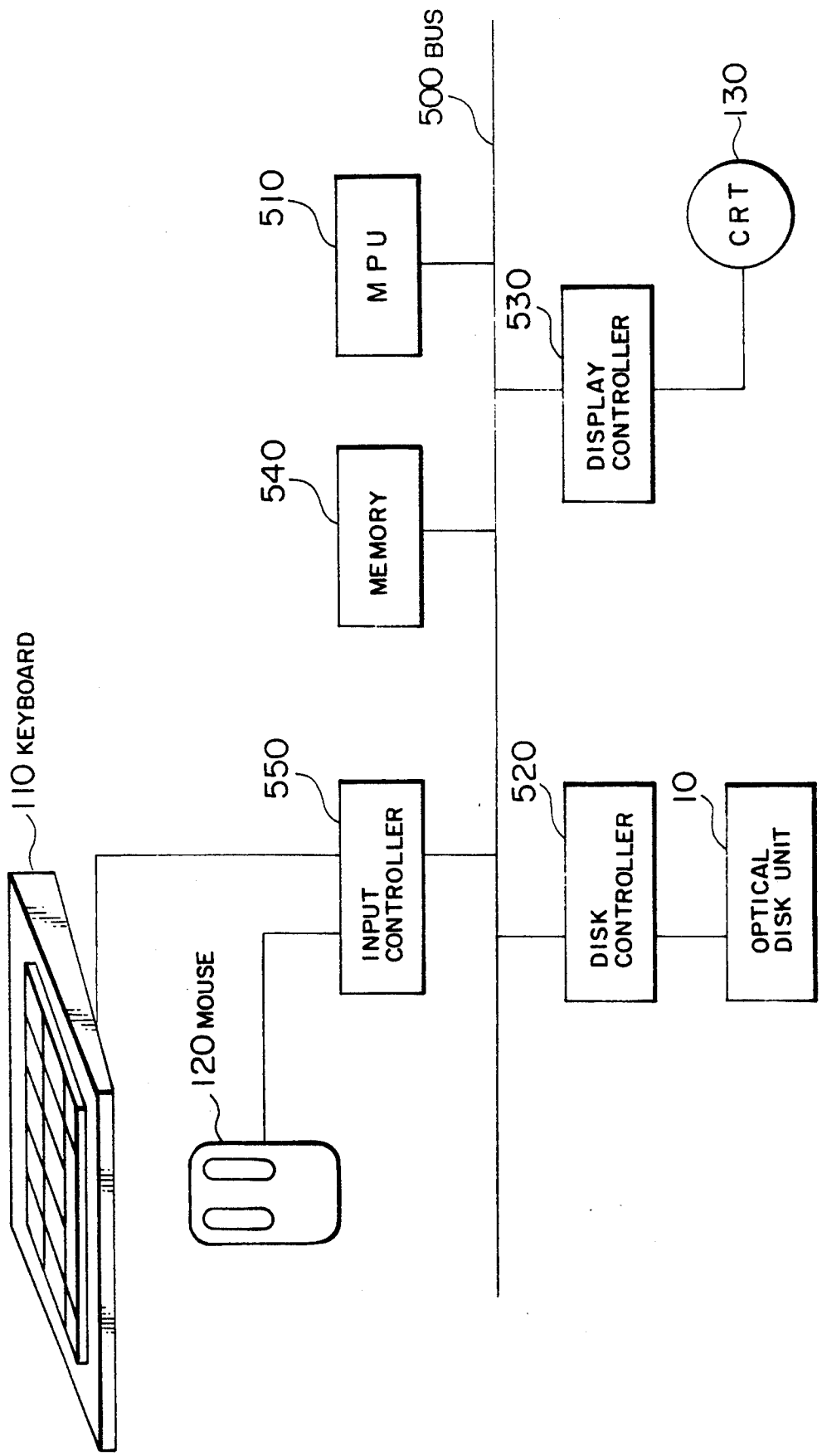
FIG. 6 shows an embodiment of a data processing system using the optical disk medium in accordance with the present invention.

Next, an embodiment of the present invention will be explained in connection with a specific application example. FIG. 6 is a block diagram of a reproducing (reading)/editing system which uses such a published electronic book (disk) that has data previously recorded in its ROM region 3 or 10-1. As a matter of course, the disk medium of the present invention is not limited to the specific electronic book but may be applied in various forms including catalogues, teaching materials and presentation media. In FIG. 6, an optical disk unit 10, which employs such an optical disk 1 of the present invention as mentioned above, is connected through a disk controller 520 and a bus 500 to a microprocessor 510. The optical disk unit 10 is arranged preferably to have a coarse actuator for moving an optical head and a fine actuator for moving a light spot at a high speed as disclosed in U.S. Pat. No. 4,607,358. A keyboard 110 and a mouse 120 are connected through an input/output controller 550 and the bus 500 to the microprocessor 510. A display 130 is also connected to the microprocessor 510 through a display controller 530 and the bus 500. Further connected to the bus 500 is a memory 540 which stores therein programs and data for the microprocessor 510. In the illustrated reproducing/editing system, the RAM region of the above optical disk medium 1 may be utilized also as a work area, but in the illustrated example, data created mainly by the user are written in the RAM region.

Figure 7:
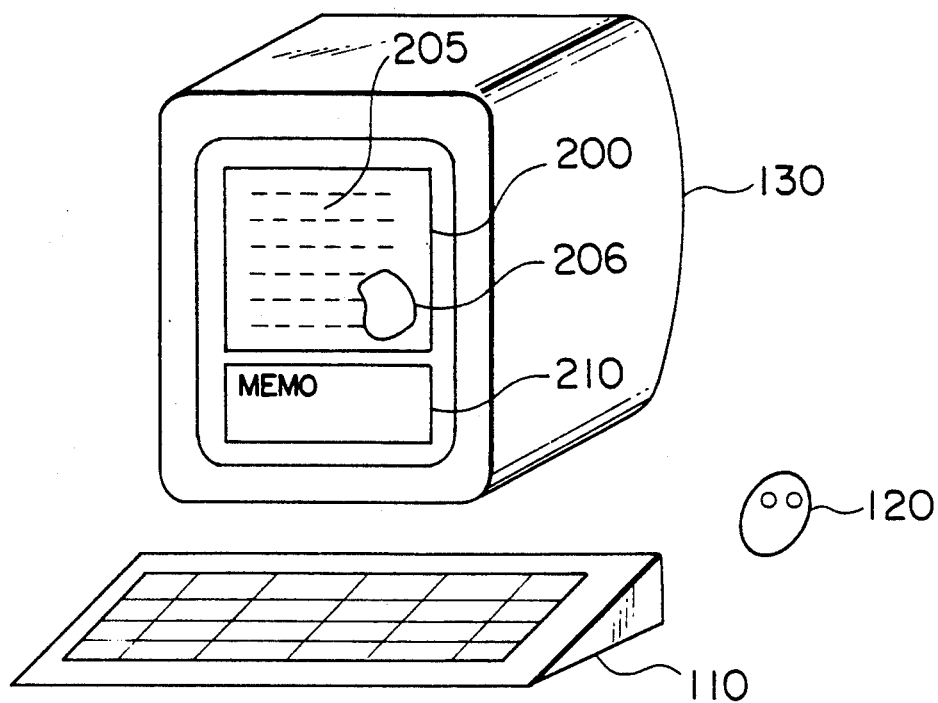
FIG. 7 shows an exemplary screen display, in a perspective view, based on the system of FIG. 6.

Shown in FIG. 7 is an exemplary screen display when the above electronic book (optical disk medium 1) is read through the reproducing/editing system. In the drawing, the display 130 has two windows on its screen which appear under the display controller 530 and in accordance with the programs stored in the memory 540. In the illustrated example, one upper window is given as a text zone 200 in which the contents read out from the ROM region 3 or 10-1 of the optical disk medium 1 are shown, while the other lower window is given as a memo zone 210 in which the user writes notes. Displayed on the text zone 200 are sentences 205, a chart 206 (including figures, tables and the like) and so on which correspond to the contents of the electronic book. In this case, data in the ROM region are stored in accordance with, for example, the Office Document Architecture (ODA) Standard (a document is defined, in a hierarchical structure, e.g., as sentence, chart (including figure and table) and picture areas; and data in the sentence area are described in the form of a train of character codes, data in the chart area are described as graphic data and data in the picture area are as run-length-coded data). Accordingly, the architecture of the sentences 205 and chart 206 included in the data read out from the ROM region is uniquely determined and the programs stored in the memory 540 are correspondingly activated to develop the chart 206 and character train 205 in the window 200. With such an electronic book, sentences, charts, figures, tables, photographs and so on included in one page of the book can be recorded in a small limited range corresponding to merely less than several tracks of the ROM region of the optical disk medium 1, and the optical head of the optical disk unit 10 can access to the limited range at a high speed so long as the accessing range is so limited. As a result, when the user wants to read successive pages of the book, he or she can successively indicate the desired pages on the display substantially without any wait time.

In the present embodiment, the ROM region of the optical disk medium 1 containing the contents of this electronic book is designed so that the ROM data of the ROM region previously written by the disk supplier prior to its marketing can be freely processed and edited by the user. Thus, there occurs a new problem on how to store new data created through user's processing and editing operation, but this problem can be solved in the following manner. That is, in the illustrated embodiment, while the user is reading the electronic book, she or he can freely write notes in the memo zone 210 appearing on the screen as shown in FIG. 7. The user can feel this as if she or he have freely notes in a printed paper book. User's writing notes in the memo zone 210 is carried out by the microprocessor 510 performing, for example, the following operation in accordance with the programs stored in the memory 540. User's writing operation within the window 210 is carried out with use of the mouse 120 and/or the keyboard 110, just as in a conventional editor of a personal computer or a word processor. Operational data created through the mouse 120 and/or keyboard 110 are sent through the input/output controller 550 and bus 500 to the microprocessor 510. The microprocessor 510, when receiving the operational data, analyzes the received data to know the intention of user's writing operation and correspondingly controls the display controller 530 to rewrite the screen of the display 130. At the same time as the above operation, the microprocessor 510 sends the written contents through the disk controller 520 to the optical disk unit 10 where the contents are recorded in the RAM region 2 or 10-2 of the optical disk medium 1.

In this manner, the contents written by the user on the display 130 is closely related to the data of a part of the ROM region 3 at a particular position (that is, corresponding to the page displayed on the screen), as a matter of course. Hence, the microprocessor 510 controls the disk controller 520 to write the written data in that part of the RAM region 2 which is very adjacent to the above part of the ROM region 3. As has been explained above, the ROM region and the RAM region adjacent to the ROM region can be alternately accessed at a high speed. Thus when these RAM and ROM regions are disposed in such a manner as mentioned above, the notes previously written by the user, i.e., the related data can thereafter be immediately read out and displayed on the screen of the display 130 at a high speed, simultaneously with the reading of the ROM data on the associated page. This results in that user's wait time can be substantially eliminated and the system can be remarkably improved in handleability.

A flow of a series of such operations is shown in FIG. 8. That is, the microprocessor 510 relates the ROM data read out from the ROM region 3 or 10-1 of the optical disk medium 1 to the RAM data read out from the RAM region 2 or 10-2 in accordance with the flowchart of the program stored in the memory 540, as follows.

First, the user selects a menu indicated on the screen of the display 130 through the microprocessor 510 or inputs a command from the keyboard 110 to specify a desired page of the electronic book in the form of the optical disk medium 1 (step 801). The microprocessor 510 reads out a directory data (corresponding to contents or indexes of an ordinary printed paper book and showing correlations between the storage state of the data written in the ROM region, such address data as the track numbers and sector numbers of the ROM region, such address data as the track numbers and sector numbers of the RAM region, and so on) previously written at a specific location of the ROM region 3 or 10-1 of the optical disk medium 1, and knows one (corresponding to a page of an ordinary printed paper book) of the tracks of the disk 1 where the desired page is stored (step 803). And the microprocessor reads out from the ROM region a ROM data corresponding to the target track assigned by the address data (step 805), and sets a pointer at the track assigned by the address data related to the read-out ROM data (step 807). The microprocessor 510 opens the window 200 as a text zone (step 809) and developingly displays the read-out ROM data on the screen (step 811). The microprocessor 510 then opens the window 210 as a memo zone (step 813) and gets ready for user's input (step 815). At this stage, the user can write notes in the window 210 of the memo zone as necessary while reading the sentences in the window 200 of the text zone.

Data written by the user are received at the microprocessor 510 as character codes or figure data, converted into ODA format data (step 817) and then stored in the RAM region 2 or 10-2 of the optical disk medium 1. The user's data writing operation is carried out in the following manner. That is, the address data of the ROM region when the page specified by the user was read out, is already held in the memory 540. The microprocessor 510 previously checks an address data of the RAM region previously related to the held address data of the ROM region by making reference to the aforementioned directory data (previously held also in the memory 540) and already set the pointer at the corresponding track (step 807). Therefore, when a new data is stored into the RAM region, the microprocessor 510 stores the new data into the track of the RAM region at which the pointer is already set (step 819) and updates the pointer (step 821). Of course, when such a menu section as an end or a next page display other than the memo writing is input (step 823), the microprocessor proceeds to its predetermined processing corresponding to the input (step 825).

Thus, when it is desired to next read out the data of the ROM region, the microprocessor 510 can read out the adjacent data of the RAM region according to the directory data and can display the read-out data on the window 210 of the memo zone together with the window 200 of the text zone substantially at the same time.

Figure 9:
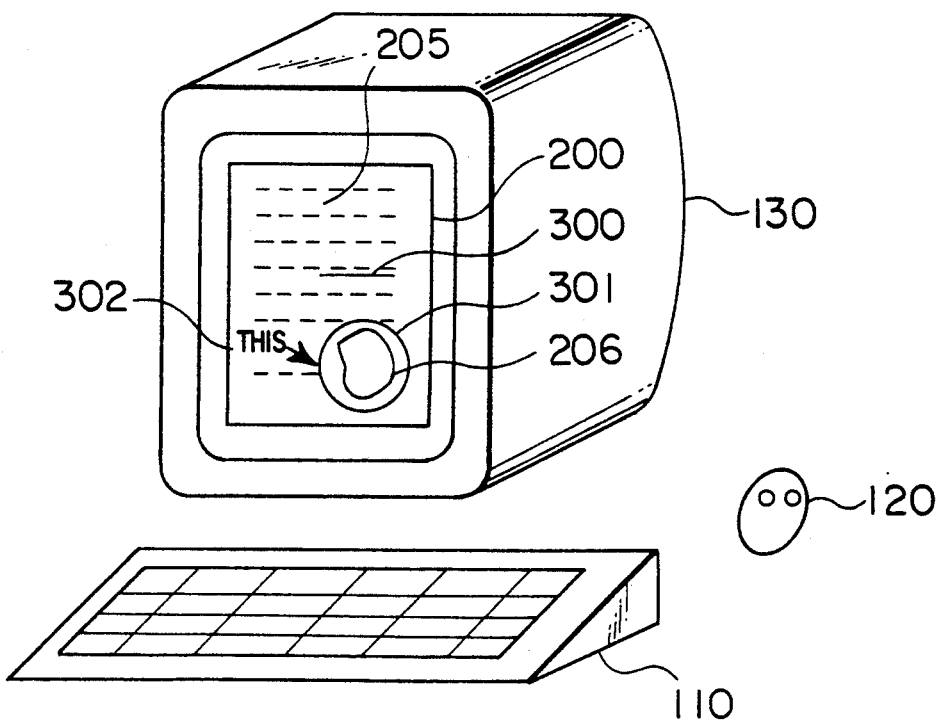
FIG. 9 shows another exemplary screen display, in a perspective view, based on the system of FIG. 6.

There is shown in FIG. 9 another example of display screen in the reproducing/editing system of FIG. 6. In FIG. 9, the display 130 has on its display screen the display zone 200 on which the sentences 205 and chart 206 read out from the ROM region as well as such notes written by the user as a circular enclosure 301 and a character entry 302 are mixedly displayed. In addition, reference numeral 300 denotes an underline written by the user.

The present embodiment is different from foregoing embodiment in that the present embodiment provides such a new method of using the disk book that the user can freely edit the contents of the electronic book to obtain a new version of book in accordance with her or his own style. That is, while the user is reading the electronic book on the display screen of the reproducing/editing system of FIG. 6, she or he can freely write notes on the screen as necessary in such a manner as shown in FIG. 9 as if she or he freely write notes in a printed paper book between lines or in a blank part of the page sheet. In addition, the user can rewrite even the contents of the text of the book as necessary on the screen. In the case of a printed paper book, it is possible to add notes in the book but it is practically impossible to rewrite the contents or text of the book. And even when the user adds notes to the book, the note adding space has been limited only to the blank parts of the book and thus it has been impossible to add a lot of notes. In the case of the electronic book in the form of the optical disk medium 1 of the present invention, on the other hand, it is possible to write any number of notes in the book as far as the capacity of the RAM region is permitted. Even when the number of notes written by the user on the display 130 is increased, the display can easily cope with this by means of scrolling of the screen. As has been explained earlier, since the ROM data stored in the ROM region 3 or 10-1 is structured in accordance with the ODA format, notes (such as the underline 300, enclosure 301, entry 302 and so on) and the modifications of the text contents done by the user are also described structurally. Accordingly, when the display screen runs short of blank space and the user writes notes by scrolling the screen, the modification of the scrolled page is described as regarded as its paper size change.

The processing operation of the present embodiment during user's writing operation is substantially the same as that already explained in connection with FIG. 8 and explanation thereof is omitted. However, since it is more convenient that notes written by the user can be distinguished from the text parts 205 and 206 on the screen, the microprocessor 510 is arranged, with respect to these data read out from the RAM region, to issue to the display controller 530 such a command that causes the different-color display of the notes and text parts, in response to a specification of such a command parameter. This can be attained by specifying such a parameter as to transfer to the subroutine of the aforementioned window control. In this case, the display controller 530, when receiving this command, sends a data indicative of different colors or fonts to the display 130 so that the original text parts can be displayed differently from the notes written by the user.

With regard to the parts written by the user, on the other hand, the microprocessor 510 performs the following processings. That is, since the text data to be rewritten by the user are stored in the ROM region, it is impossible to directly rewrite them. User's rewriting operation is carried out with the help of the mouse 120 and keyboard 110 in the same manner as in an editor of an ordinary personal computer. A data given through the operation of the mouse 120 and keyboard 110 is transmitted from the input/output controller 550 through the bus 500 to the microprocessor 510. The microprocessor 510, when receiving the data, controls the display controller 530 on the basis of the received data and rewrites the screen of the display 130. The screen of the display 130 can be rewritten at any time but the ROM region of the optical disk medium 1 cannot be easily rewritten. Thus the rewriting of the ROM region is carried out as follows. First, the microprocessor 510 detects a difference between the original text part and the result rewritten through user's specification and then converts the difference into a difference data described in the ODA format. The microprocessor then sends the ODA format difference data through the disk controller 520 to the optical disk unit 10 to record the data in the RAM region 2 of the optical disk medium 1.

In this way, the text contents written or rewritten by the user on the display 130 are closely related to certain specific ROM data. Therefore, the microprocessor 510 controls the disk controller 520 to write the aforementioned difference data into that part of the RAM region 2 or 10-2 very adjacent to the associated part of the ROM region 3 or 10-1. How to relate the difference data to an address data in the RAM region is the same as how to store data written in the window 210 of the memo zone mentioned above. With such an arrangement, when the user wants thereafter to read the book, the related data, i.e., the additional data (stored as the difference data described in terms of the ODA format) such as user own memos or rewritten text contents can be immediately read out simultaneously with the reading out of the ROM data corresponding to the display page, synthesized with the ODA format of the text read out from the ROM region, developed and then displayed on the screen of the display 130 at a high speed. As a result, the user wait time can be substantially eliminated and the system handleability can be improved to a large extent.

Another feature of the present embodiment is that, even after the user rewrites the text contents of the book, the original text remains in the ROM region 3 of the disk medium 1 without being erased. For this reason, the user can selectively read the original text and her or his own rewritten text of the electronic book. At this time, the user gives her or his selection through the operation of the keyboard 110 or mouse 120 and the then user's selection data through the mouse 120 or 110 is sent from the input/output controller 550 and bus 500 to the microprocessor 510. The microprocessor 510, when receiving the selection data, analyzes the received selection data to know user's selection, i.e., whether the user wants to read the original or rewritten text, controls the display controller 530 and rewrites the screen of the display 130 according to the selection. In such a manner as mentioned above, the user can use the electronic book in a new usage by freely editing the electronic book and making her or his own style of book.

As has been disclosed in the foregoing, in accordance with the present invention, not only the ROM region of the optical disk can be inexpensively manufactured on a mass production basis by the replica technique but the user can also record the data related to the data of the ROM region into the RAM region. Further, since the optically readable ROM region and the recordable/readable/erasable RAM region are disposed on the optical disk in a mutually adjacent positional relationship, the ROM and RAM regions can be alternately and continuously accessed at a high speed. Furthermore, the data related to the data recorded in the ROM region is arranged to be written in that part of the RAM region very adjacent to the associated data part of the ROM region. As a result, when the user wants to read the electronic book, the related data can be immediately read out simultaneously with the reading out of the ROM region, whereby the user wait time can be substantially eliminated and the system can be remarkably improved in handleability.

in addition, when the user rewrites the text contents of the book, the rewritten data are stored in the RAM region of the disk medium and the original text contents remain in the ROM region without being erased. Thus, the user can freely select the original or rewritten text contents of the electronic book and therefore can freely edit the electronic book data and make her or his own style of book as a new book usage.

What is claimed is:

1. An optical disk medium adapted to be read by a movable optical head having means for deflection scanning of a light spot, comprising a first region (ROM region) having first data already recorded therein and capable of being optically only read out therefrom by a movable optical head having a deflection scannable light spot and a second region (RAM region) having second data capable of being optically recorded therein and read out therefrom by the movable optical head with the deflection scannable light spot interlacedly located on said optical disk medium, and at least a portion of the second data related to the first data stored in said first region is stored in a part of said second region which is located in such a positional relationship that allows substantially continuous access to a part of said first region where said first data related thereto is stored so that at least read out of the first and second related data is enabled by deflection scanning of the light spot without effecting movement of the movable optical head.

2. An optical disk medium as set forth in claim 1, wherein said first data of said first region are preformatted in the form of phase pits.

3. An optical disk medium as set forth in claim 2, wherein said second data is created when the first data stored in said first region is subjected to editing.

4. An optical disk medium as set forth in claim 2, wherein said second data is a data corresponding, to a variation in the first data stored in said first region created when the stationary data is subjected to editing.

5. An optical disk medium as set forth in claim 1, wherein said first and second regions are interlacedly provided as angularly divided and as positioned alternately along tracks.

6. An optical disk medium as set forth in claim 1, wherein said first and second regions are positioned concentrically alternately and adjacent ones of the first and second regions are disposed so as to enable at least read out therefrom only through deflection scanning of the light spot without requiring movement of the optical head.

7. A data processing method using an optical disk medium wherein a first region (ROM region) having first data already recorded therein and capable of being optically only read out therefrom by a movable optical head having means for deflecting scanning of a light spot for output to an output unit and a second region (RAM region) having second data capable of being optically recorded therein and read out therefrom by the optical head with the light spot are interlacedly located on said optical disk medium in such a positional relationship that at least read out from at least portions of said first and second regions is enabled by deflection scanning of the light spot without effecting movement of the optical head; said method comprising the steps of:
  reading out the first data;
  outputting the first data which has been read out to the output unit;
  when the second data to be stored in said second region is created during a period of outputting the first data, finding a storage location in said first region at which the first data is stored; and
  storing said created second data at such a location in said second region that enables deflection scanning of the light spot of the optical head on said found storage location in said first region without effecting movement of the optical head.

8. A data processing method as set forth in claim 7, wherein said first data of said first region is preformatted in the form of phase pits.

9. A data processing method as set forth in claim 7, wherein said second data is created when the first data stored in said first region is subjected to editing.

10. A data processing method as set forth in claim 7, wherein said second data is a data corresponding to a variation in the first data stored in said first region created when the first data is subjected to editing.

11. A data processing method as set forth in claim 8, wherein said first and second regions are interlacedly provided as angularly divided and as positioned alternately along tracks.

12. A data processing method as set forth in claim 8, wherein said first and second regions are positioned concentrically alternately and adjacent ones of the first and second regions are disposed so as to enable at least read out therefrom only through deflection scanning of the light spot without requiring movement of the optical head.

13. A data processing system using an optical disk medium, comprising:

optical disk unit driving said optical disk medium wherein a first region (ROM region) having first data already recorded therein and capable of being optically only read out therefrom by a movable optical head having means for deflection scanning of a light spot and a second region (RAM region) having second data capable of being optically recorded therein and read out therefrom by the optical head with the light spot are interlacedly located on said optical disk medium in such positional relationship that at least read out from at least portions of said first and second regions is enabled by deflection scanning of the light spot without effecting movement of the optical head;

an input unit;

a display unit; and a controller connected to said optical disk unit said input unit and said display unit to control operations thereof in such a manner that the first data stored in said first region is displayed on said display unit when the second data to be stored in said second region is created under a command from said input unit, the second data is displayed together with the display of the first data displayed on a screen of said display unit, a storage location in said first region at which said displayed first data is stored is found and said created second data is stored at such a location in said second region that enables deflection scanning of the light spot of said found storage location in said first region without effecting movement of the optical head.

14. A data processing system as set forth in claim 13, wherein said first data of said first region are preformatted in the form of phase pits.

15. A data processing system as set forth in claim 14, wherein said second data is created when the first data stored in said first region is subjected to editing.

16. A data processing system as set forth in claim 13, wherein said second data is data corresponding to a variation in the first data stored in said first region created when the first data is subjected to editing.

17. A data processing system as set forth in claim 14, wherein said first and second regions are interlacedly provided as angularly divided and as positioned alternately along tracks.

18. A data processing system as set forth in claim 14, wherein said first and second regions are positioned concentrically alternately and adjacent ones of the first and second regions are disposed so as to enable at least read out therefrom only through deflection scanning of the light spot without requiring movement of the optical head.

19. A data processing system for use with an optical disk medium, comprising:

an optical disk unit for driving an optical disk medium which includes a first region (ROM region) in which first data is already stored and is read therefrom by an optical head having means for deflection scanning of a light spot and a second region (RAM region) which allows data to be optically stored therein and read therefrom by the optical head with the light spot, said first and second regions being interlacedly disposed within such a positional range that at least read out from said first and second regions is enabled by deflection scanning of the light spot without effecting movement of the optical head;

an input unit;

a display unit; and a control unit coupled to said optical disk unit, input unit and display unit for controlling thereof said control unit including:

means for displaying the first data read out from said first region on said display unit under a command from said input unit;

means for displaying the second data to be stored in said second region on said display unit together with said displayed first data;

means for locating a storage location on said optical disk medium at which said first data is stored; and means for controlling said optical disk unit so that said second data is stored at a location in said second region that enables deflection scanning of the light spot of said located storage location for said first data without effecting movement of the optical head.

* * * * *